(12) United States Patent
Li et al.

(10) Patent No.: US 12,423,012 B2
(45) Date of Patent: Sep. 23, 2025

(54) METRICS DATA STORAGE AND ACCESS

(71) Applicant: SAP SE, Walldorf (DE)

(72) Inventors: Hui Li, Shanghai (CN); Xia Yu, Shanghai (CN); Zhen Zhang, Shanghai (CN)

(73) Assignee: SAP SE, Walldorf (DE)

( * ) Notice: Subject to any disclaimer, the term of this patent is extended or adjusted under 35 U.S.C. 154(b) by 87 days.

(21) Appl. No.: 18/469,650

(22) Filed: Sep. 19, 2023

(65) Prior Publication Data

US 2025/0094069 A1  Mar. 20, 2025

(51) Int. Cl.
*G06F 16/25* (2019.01)
*G06F 3/06* (2006.01)

(52) U.S. Cl.
CPC .............. *G06F 3/064* (2013.01); *G06F 3/067* (2013.01); *G06F 3/0622* (2013.01)

(58) Field of Classification Search
CPC ........ G06F 16/283; G06F 3/064; G06F 3/067; G06F 3/0622
See application file for complete search history.

(56) References Cited

U.S. PATENT DOCUMENTS

| | | | |
|---|---|---|---|
| 8,019,788 B1 * | 9/2011 | Carter | H03M 7/30 707/602 |
| 2020/0285619 A1 * | 9/2020 | Teyer | G06F 16/2282 |
| 2021/0063200 A1 * | 3/2021 | Kroepfl | C03C 17/3644 |
| 2024/0119226 A1 * | 4/2024 | Simonyi | G06F 40/18 |
| 2024/0264990 A1 * | 8/2024 | Kumar | G06F 16/2219 |

FOREIGN PATENT DOCUMENTS

CN        115220798 A  * 10/2022  ............... G06F 8/65

* cited by examiner

*Primary Examiner* — Tarek Chbouki
(74) *Attorney, Agent, or Firm* — Fish & Richardson P.C.

(57) ABSTRACT

Methods, systems, and computer-readable storage media for receiving metric data of a cloud system periodically; transforming the metric data of each type into a byte array using mapping tables, wherein the byte array is an encoded format of the metric data, where each field of the metric data is encoded as a field ID and a field type ID that are short integer variables; merging and storing the byte arrays of multiple metric data into a binary file, wherein the binary file comprises multiple blocks with each block comprising multiple byte arrays; generating indexes for common fields of different metric data in the binary file; receiving a retrieval request requesting metric records including a common field of a particular value; determining storage locations of one or more metric records satisfying the retrieval request; and obtaining the one or more metric records from the binary file using the corresponding storage locations.

17 Claims, 4 Drawing Sheets

METRICS DATA STORAGE AND ACCESS

BACKGROUND

A growing number of systems are being migrated to cloud. Monitoring software constantly monitors the operation of the cloud system. Consequently, an ever-increasing volume of metric data monitored by the monitoring software is generated. The surge of monitored metric data can take a considerable amount of hardware resources for storage. In addition, the huge amount of metric data can overwhelm metric data monitoring and processing systems and lead to poor performance.

SUMMARY

Implementations of the present disclosure are directed to data management. More particularly, implementations of the present disclosure are directed to storing metric data of a cloud system in a compact manner to save storage resources, and accessing the stored metric data using indexes without scanning the whole dataset.

In some implementations, actions include receiving metric data of a cloud system periodically, wherein the metric data comprises a plurality of fields; transforming the metric data of each type into a byte array using mapping tables, wherein the byte array is an encoded format of the metric data, where each field of the metric data is encoded as a field ID and a field type ID that are short integer variables; merging and storing the byte arrays of multiple metric data into a binary file, wherein the binary file comprises multiple blocks with each block comprising multiple byte arrays; generating indexes for common fields of different metric data in the binary file; receiving a retrieval request requesting metric records including a common field of a particular value; determining storage locations of one or more metric records satisfying the retrieval request using the index of the common field; and obtaining the one or more metric records satisfying the retrieval request from the binary file using the corresponding storage locations. Other implementations of this aspect include corresponding systems, apparatus, and computer programs, configured to perform the actions of the methods, encoded on computer storage devices.

These and other implementations can each optionally include one or more of the following features. In some implementations, the actions can include redefining each field included in the metric data in the mapping tables. In some implementations, redefining each field can include: mapping a field name of the field into a field ID in a first mapping table; and mapping a data type of the field into a field type ID in a second mapping table. In some implementations, the field ID can be a short integer variable representing the field name, and the field type ID can be a second short integer variable representing the data type of the field.

In some implementations, the byte arrays in the binary file can be ordered by corresponding time stamps. In some implementations, the index of a common field can be included in i) an offset table comprising a position offset of each matching metric record in the binary file, and ii) a key table indicating a number of matching metric records for each particular value and a stating location of the number of metric records in the offset table. In some implementations, the index of a common field can indicate a storage location of a metric record included in the binary file that matches the particular value of the common field.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to data management. More particularly, implementations of the present disclosure are directed to storing metric data of a cloud system in a compact manner to save storage resources, and accessing the stored metric data using indexes without scanning the whole dataset. Implementations can include actions of receiving metric data of a cloud system periodically, wherein the metric data comprises a plurality of fields; transforming the metric data of each type into a byte array using mapping tables, wherein the byte array is an encoded format of the metric data, where each field of the metric data is encoded as a field ID and a field type ID that are short integer variables; merging and storing the byte arrays of multiple metric data into a binary file, wherein the binary file comprises multiple blocks with each block comprising multiple byte arrays; generating indexes for common fields of different metric data in the binary file; receiving a retrieval request requesting metric records including a common field of a particular value; determining storage locations of one or more metric records satisfying the retrieval request using the index of the common field; and obtaining the one or more metric records satisfying the retrieval request from the binary file using the corresponding storage locations.

To provide further context for implementations of the present disclosure, and as introduced above, as more and more systems are being migrated to the cloud, the monitoring software plays a crucial role in constantly overseeing the cloud system's operations. This results in a continuous influx of metric data of the cloud system. The significant increase in the monitored metric data places a heavy demand on the hardware resources for storage. Additionally, the huge volume of metric data can overwhelm the monitoring and processing systems, leading to performance issues.

In view of the above context, implementations of the present disclosure provide capabilities to provide efficient storage of the metric data. Specifically, the technologies described herein transform the original metric data into formatted compact binary files, resulting in a compression rate of 50%-60% compared to raw metric data files. Additionally, the technologies described herein generate indexes for the formatted compact binary files, enabling efficient retrieval and access to the metric data without the need to scan the entire dataset. It's important to note that although metric data is used as an example, the systems and methods described in this document are not limited to metric data.

Figure 1:
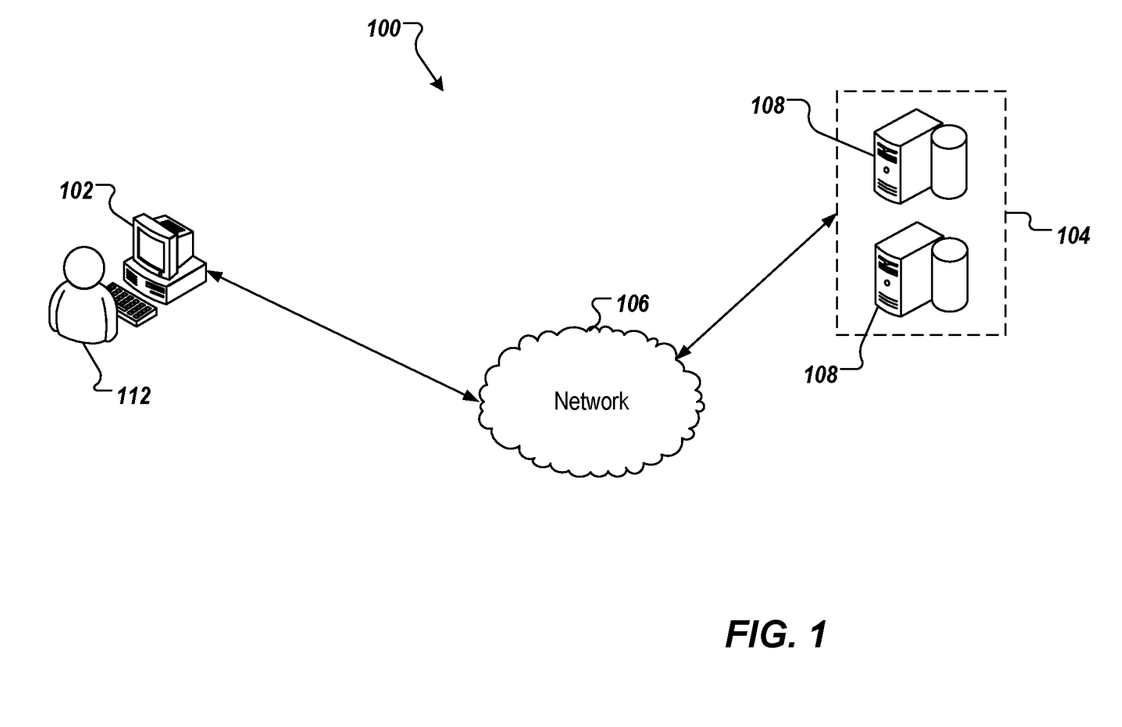
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a metric data management platform for storing the metric data of a cloud system and accessing the stored metric data. The metric data management platform can store the metric data of the cloud system in an efficient manner by transforming the original metric data into formatted compact binary files with a 50%-60% compression rate than raw files of the metric data. Furthermore, the metric data platform can create indexes for the formatted compact binary files, which can be used to efficiently retrieve and access the metric data without scanning the whole dataset. Metric data are used as an example, the systems and methods described in this document are not limited to metric data.

Figure 2:
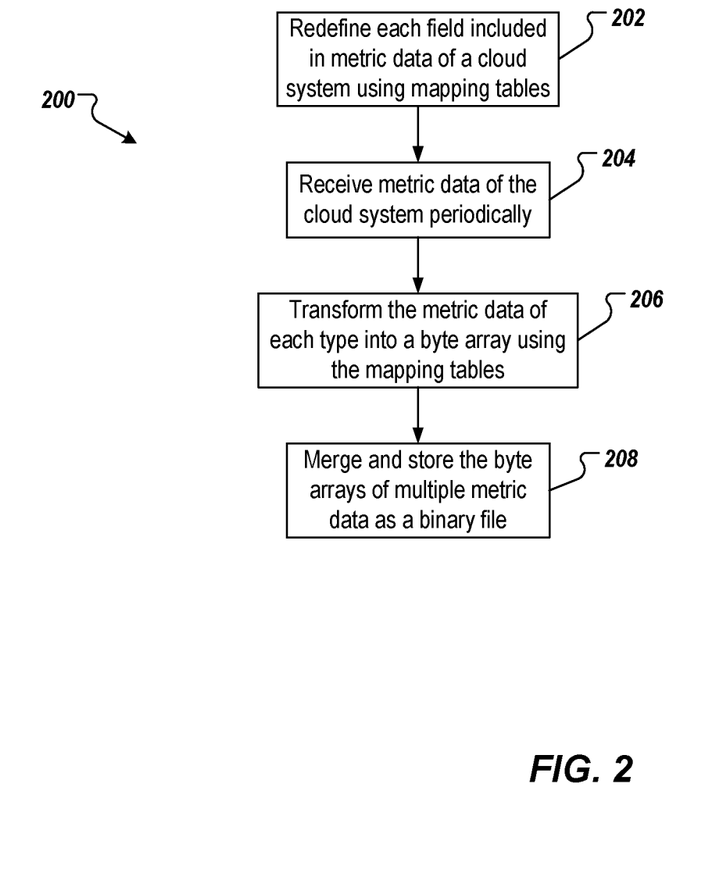
FIG. 2 depicts an example process for storing metric data that can be executed in accordance with implementations of the present disclosure.

FIG. 2 depicts an example process 200 for storing metric data that can be executed in accordance with implementations of the present disclosure. In some examples, the example process 200 is provided using one or more computer-executable programs executed by one or more computing devices.

At step 202, each field included in the metric data of a cloud system is redefined using mapping tables. Specifically, the metric data of a certain type includes multiple fields, and each field includes a field name and a field value. The field name of each field can be mapped into a predefined field ID in a first mapping table. The data type of each field can be mapped into a predefined field type ID in a second mapping table. The field ID is a short integer variable representing the original field name. The field type ID is another short integer variable representing the data type of the field.

For example, one type of metric data can be "LinuxOS" metric data. The "LinuxOS" metric data can include multiple fields, shown below:

---

[LinuxOS] timestamp:1669170038456, hostname:"host1", hostIp:"10.1.2.3", cpuUsage:75, systemLoad:14.5, memoryTotal:102400, memoryFree:61440, memoryUsage:60, diskTotal:5242880, diskFree:2097152, diskUsage:40, networkReceive:123456, networkSend: 654321

---

In this example, the first field is the type of metric data type, e.g., "metricsType," which has a value of "LinuxOS." The next field of the "LinuxOS" metric data includes a field name "timestamp" and a field value "1669170038456."

In another example, a type of metric data can be "GatewayRequest" metric data. "GatewayRequest" metric data can include multiple fields, shown below:

---

[GatewayRequest] timestamp:1669170038457, hostname:" host1", hostIp: "10.1.2.3", clientIp:2.20.143.39, recordCount:1000, requestId: "85a77624-3a25-45e6-a389-26e00b0b12a9", companyId: "CompanyABC", username: "user123", requestSize: 62343, responseSize:762343, responseCode:200, requestType: "POST", requestUri:"/odata/v2/ComplianceUserFormData"

---

A field type mapping table is used to define a field type. For example, the field type mapping table can include multiple records with each record defining a particular field type. For example, as shown in Table 1, the field type "byte" is mapped to a field type ID "1," and the field type "integer" is mapped to a field type ID "2." Using this field type mapping table, different field types, such as "byte," "integer," and "long," can be represented as short integers "1," "2," and "3." The mapped short integer values "1," "2," and "3" take less storage room than the original values "byte," "integer," and "long." Furthermore, the field type mapping table can include a column representing the byte length of the field type. For instance, field type "byte" has a length of "1" byte, and the field type "integer" has a byte length of "4."

TABLE 1

| Field Type Id (Byte Type) | Field Type | Byte Length of Field Type |
|---|---|---|
| 1 | byte | 1 |
| 2 | integer | 4 |
| 3 | long | 8 |
| 4 | double | 8 |
| 5 | float | 4 |
| 6 | short | 2 |
| 7 | string | — |
| ... | ... | |

Furthermore, a field name mapping table is used to define the field name. For example, the field name mapping table can include multiple records with each record defining a particular field name. For example, as shown in Table 2, the field name "timestamp" is mapped to a field ID "2." The field name mapping table also includes the field type of each field name. For instance, the field type of "timestamp" is "long," which is mapped to field type ID "3" according to Table 1. Using this field name mapping table, each field name, such as "metricsType," "timestamp," and "hostname," can be represented as a short integer "1," "2," and "3." The mapped integer values "1," "2," and "3" take less storage room than the original field names "metricsType," "timestamp," and "hostname."

At step 204, metric data of the cloud system are received periodically. The metric data can include a plurality of fields. As discussed above, each field can include a field name and a field value. An example of a field is "timestamp: 1669170038456," where the field name is "timestamp" and the field value is "1669170038456."

At step 206, the metric data of each type is transformed into a byte array using the mapping tables. The byte array of the metric data takes less storage space than the original metric data. The byte array for each field includes the field ID and the field type ID. The byte array for the field can also include the original field value. The byte array of the metric data can be an encoded format of the original metric data, where each original field of the metric data is encoded as the field ID and the field type ID, that are short integer variables.

For example, as shown in Table 3, the byte array includes the encoded format of multiple fields. The encoded format for a first field "field 1" includes "field 1 ID," "field1 type ID" and "field1 value." The number in the brackets is the byte count of the value in the cell.

In a more specific example, assuming that a field is "timestamp: 1669170038456," the encoded format for this field is "2(2), 3(1), 1669170038456," where "2(2)" represents that the field ID for the field name "timestamp" is the short integer variable "2" according to Table 2, and the field ID has a byte length of "2" indicated in the bracket. Similarly, "3(1)" represents that the field type ID for the timestamp value is the short integer "3" for the type "long" according to Table 1. And the field type ID has a byte length of "1." "1669170038456" represents the field value, which is maintained in the byte array.

TABLE 2

| Field Id (Short Integer Type) | Field Name | Field Type Id | Example value | Remark |
|---|---|---|---|---|
| 1 | metricsType | 7(string) | LinuxOS, GatewayRequest | Common field Ids for all types of metrics. |
| 2 | timestamp | 3(long) | 1669170038456 | |
| 3 | hostname | 7(string) | host1 | |
| 4 | hostIp | 7(string) | 10.1.2.3 | |
| 5 | cpuUsage | 2(integer) | 75 | Field Ids for LinuxOS metrics. |
| 6 | systemLoad | 5(float) | 14.8 | |
| 7 | memoryTotal | 2(integer) | 102400 | |
| 8 | memoryFree | 2(integer) | 61440 | |
| 9 | memoryUsage | 2(integer) | 60 | |
| 10 | diskTotal | 2(integer) | 5242880 | |
| 11 | diskFree | 2(integer) | 2097152 | |
| 12 | diskUsage | 2(integer) | 40 | |
| 13 | networkReceive | 2(integer) | 123456 | |
| 14 | networkSend | 2(integer) | 654321 | |
| 15 | clientIp | 7(string) | 2.20.143.39 | Field Ids for GatewayRequest metrics |
| 16 | recordCount | 2(integer) | 1000 | |
| 17 | requestId | 7(string) | 85a77624-3a25-45e6-a389-26e00b0b1 | |
| 18 | companyId | 7(string) | CompanyABC | |
| 19 | username | 7(string) | user123 | |
| 20 | requestSize | 2(integer) | 62343 | |
| 21 | responseSize | 2(integer) | 762343 | |
| 22 | responseCode | 2(integer) | 200 | |
| 23 | requestType | 7(string) | POST | |
| 24 | requestUri | 7(string) | /odata/v2/ComplianceUserFormData | |
| ... | ... | ... | ... | |

TABLE 3

| total byte length(4) | count of field(4) | |
|---|---|---|
| field1 id(2) | field1 type(1) | field1 value |
| field2 id(2) | field2 type(1) | field2 value |
| field3 id(2) | field3 type(1) | field3 value |
| field4 id(2) | field4 type(1) | field4 value |
| field5 id(2) | field5 type(1) | field5 value |
| . . . | . . . | . . . |

By transforming each field included in the metric data into the encoded format, the byte array can be obtained. For example, the "LinuxOS" metric data

[LinuxOS] timestamp:1669170038456, hostname:"host1", hostIp:"10.1.2.3", cpuUsage:75, systemLoad:14.5, memoryTotal:102400, memoryFree:61440, memoryUsage:60, diskTotal:5242880, diskFree:2097152, diskUsage:40, networkReceive:123456, networkSend: 654321 can be transformed into the byte array shown in Table 4.

TABLE 4

| 124(4) | 14(4) | 1(2) | 7(1) | 7(2) | LinuxOS(7) | |
| --- | --- | --- | --- | --- | --- | --- |
| 7(1) | 5(2) | host1(5) | 4(4) | 7(1) | 8(2) | |
| 6(2) | 5(1) | 14.5(4) | 7(2) | 2(1) | 102400(4) | |
| 2(1) | 60(4) | 10(2) | 2(1) | 5242880(4) | 11(2) | |
| 40(4) | 13(2) | 2(1) | 123456(4) | 14(2) | 2(1) | |
| | | 2(2) | 3(1) | 1669170038456(8) | 3(2) | |
| | | 10.1.2.3(8) | 5(2) | 2(1) | 75(2) | |
| | | 8(2) | 2(1) | 61440(4) | 9(2) | |
| | | 2(1) | 2097152(4) | 12(2) | 2(1) | |
| | | | 654321(4) | | | |

The length of the original "LinuxOS" metric data is 249 bytes. After transformation, the byte array has a length of 124 bytes, which is 50% of original metrics data.

At step 208, the byte arrays of multiple metric data are merged and stored as a binary file. After more metric data are transformed into byte arrays, the byte arrays can be merged into a block. A binary file can include multiple blocks. For example, a binary file can be in the format of Table 5. The byte arrays included in the binary file can be ordered by corresponding timestamps, such as the start timestamp and the end timestamp of each metric data.

TABLE 5

| byte length of block 1(4) | record count of block 1(4) | | | | | | |
|---|---|---|---|---|---|---|---|
| byte length of record 1(4) | field count(4) | field1 id(2) | field1 type(1) | field1 value | field2 id(2) | field2 type(1) | field2 value . . . |
| byte length of record 2(4) | field count(4) | field1 id(2) | field1 type(1) | field1 value | field2 id(2) | field2 type(1) | field2 value . . . |
| byte length of record 3(4) | field count(4) | field1 id(2) | field1 type(1) | field1 value | field2 id(2) | field2 type(1) | field2 value . . . |
| . . . | | | | | | | |
| byte length of block 2(4) | record count of block 2(4) | | | | | | |
| byte length of record 1(4) | field count(4) | field1 id(2) | field1 type(1) | field1 value | field2 id(2) | field2 type(1) | field2 value . . . |
| byte length of record 2(4) | field count(4) | field1 id(2) | field1 type(1) | field1 value | field2 id(2) | field2 type(1) | field2 value . . . |
| byte length of record 3(4) | field count(4) | field1 id(2) | field1 type(1) | field1 value | field2 id(2) | field2 type(1) | field2 value . . . |
| . . . | | | | | | | |
| byte length of block 3(4) | record count of block 3(4) | | | | | | |
| byte length of record 1(4) | field count(4) | field1 id(2) | field1 type(1) | field1 value | field2 id(2) | field2 type(1) | field2 value . . . |
| byte length of record 2(4) | field count(4) | field1 id(2) | field1 type(1) | field1 value | field2 id(2) | field2 type(1) | field2 value . . . |
| byte length of record 3(4) | field count(4) | field1 id(2) | field1 type(1) | field1 value | field2 id(2) | field2 type(1) | field2 value . . . |
| . . . | | | | | | | |

In some implementations, a binary file can include the metric data of a day, or a week, or any other time period. The binary file can be named based on the start timestamp and the end timestamp, such as metrics_{startTimestamp}_{endTimestamp}.data.

In some implementations, multiple binary files can be merged into a bigger binary file, and still be ordered by the timestamp. The binary file of the metric data can be stored in a storage device. The binary file can include a plurality of metric records, with each metric record corresponding to a storage location.

Figure 3:
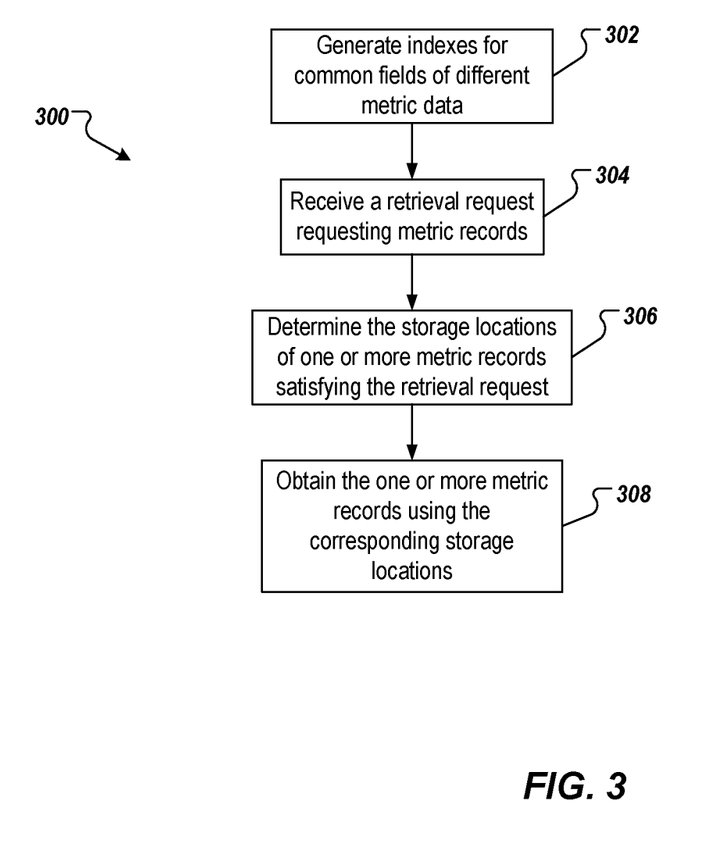
FIG. 3 depicts an example process for retrieving metric data that can be executed in accordance with implementations of the present disclosure.

FIG. 3 depicts an example process 300 for retrieving metric data that can be executed in accordance with implementations of the present disclosure. In some examples, the example process 300 is provided using one or more computer-executable programs executed by one or more computing devices.

At step 302, indexes for common fields of different metric data are generated. In some implementations, multiple metric data may have common fields. For example, the common fields can include metricsType, hostname, hostIP, etc.

In one example, a common field is cpuUsage. The indexes for cpuUsage are generated. The binary file metrics_{startTimestamp}_{endTimestamp}.data is scanned to read every byte array record included in the binary file. Based on the scanning, there are 4 values for cpuUsage, such as 60, 70, 80, and 90. The metric records that match the cpuUsage can be obtained. Table 6 shows the metric records in the binary file matching the cpuUsage. For example, there are 4 metric records matching the cpuUsage of "80." The 4 metric records are stored in the binary file in the location indicated by the position offset. The position offset indicates the storage location of a certain record in the binary file in terms of byte compared to the beginning of the binary file. For example, position offset "1091111" indicates that the corresponding metric record is located 1091111 bytes away from the beginning of the binary file.

TABLE 6

| cpuUsage | Matched metrics record count | Record position offset in file metric_{start}_{end}.data |
|---|---|---|
| 80 | 4 | 10911111, 20722222, 30433333, 40944444 |
| 90 | 2 | 11455555, 21876666 |
| 60 | 6 | 12567777, 22348888, 32789999, 42120000, 52181212, 62713434 |
| 70 | 3 | 13805656, 23407878, 33589090 |

After obtaining the matching metric record, the metric records are ordered based on the cpuUsage (60, 70, 80, 90). As a result, the ordered metric records are included in an offset table, e.g., Table 7. Specifically, the first row in Table 7 corresponds to the 6 metric records matching cpuUsage "60," the second row corresponds to the metric records matching cpuUsage "70," the third row corresponds to the metric records matching cpuUsage "80," and the fourth row corresponds to the metric records matching cpuUsage "90." The values of each row are the storage location (e.g., position offset in the binary file) of the matching metric records. The number in the brackets is the byte count of the value in the cell.

TABLE 7

| | | | | | |
|---|---|---|---|---|---|
| 12567777(8) | 22348888(8) | 32789999(8) | 42120000(8) | 52181212(8) | 62713434(8) |
| 13805656(8) | 23407878(8) | | 33589090(8) | | |
| 10911111(8) | 20722222(8) | 30433333(8) | | 40944444(8) | |
| 11455555(8) | | | 21876666(8) | | |

After obtaining the offset table, e.g., Table 7, a key table can be created, as shown in Table 8. The key table indicates the number of matching metric records for each particular value and a stating location of the number of matching metric records in the offset table. For example, the first column in Table 8 indicate the cpuUsage values "60," "70," "80," and "90." The second column indicates the number of matching metric records. The third column indicates the offset value (e.g., starting location) of the number of matching metric records in the offset table. For example, the matching records of cpuUsage "60" has an offset value of "0," because the matching records of cpuUsage "60" are included in cells of Table 7 starting from the beginning of Table 7, e.g., cell 0. The matching records of cpuUsage "70" has an offset value of "6," because the matching records of cpuUsage "70" are included in cells of Table 7 starting from cell 6 of Table 7. The number in the brackets is the byte count of the value in the cell.

TABLE 8

| | | |
|---|---|---|
| 60(4) | 6(4) | 0(4) |
| 70(4) | 3(4) | 6(4) |
| 80(4) | 4(4) | 9(4) |
| 90(4) | 2(4) | 13(4) |

The index of a common field can be included in the offset table and the key table for the field. In other words, the index of a common field indicates a storage location of a metric record included in the binary file that matches a particular value of the common field. The storage location can be obtained using the key table and the offset table.

At step 304, a retrieval request requesting metric records including a common field of a particular value is received from a client device. In some implementations, the value can be a value range. For example, the request can request metric records including cpuUsage >=80.

At step 306, the storage locations of one or more metric records satisfying the retrieval request are determined using the index of the common field. To avoid the full binary file scan, the indexes of the field are used. Specifically, using the key table for the "cpuUsage," the server system can determine that there are 4 matching metric records having cpuUsage of 80 and there are 2 matching metric records having cpuUsage of 90. The storage locations of the 4 matching metric records having cpuUsage of 80 can be found in the offset table starting from cell "9." The storage locations of the 6 matching metric records having cpuUsage of 90 can be found in the offset table starting from cell "13."

At step 308, the one or more metric records satisfying the retrieval request are obtained from the binary file using the corresponding storage locations and returned to the client device.

Figure 4:
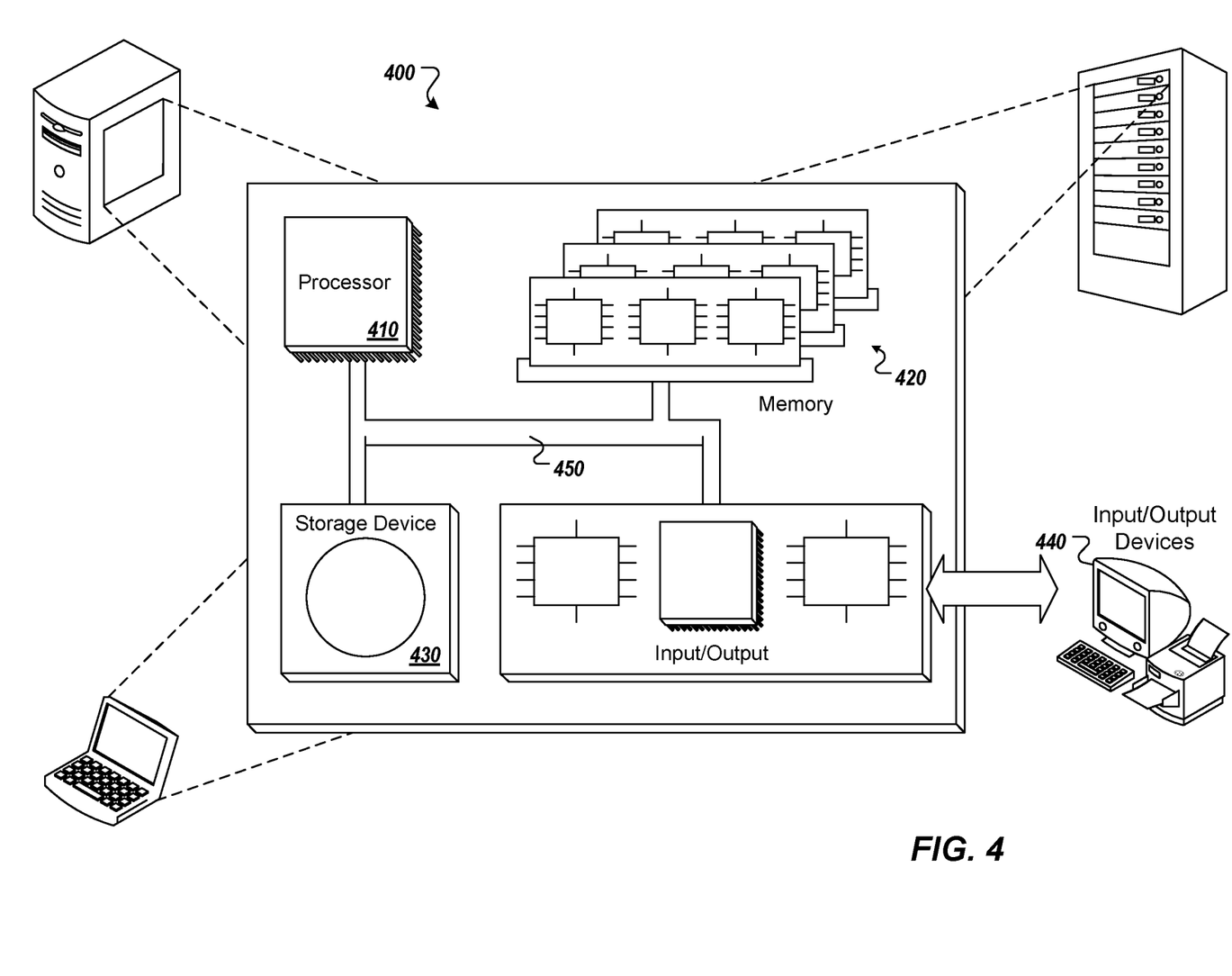
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for metric data management, the method being executed by one or more processors and comprising:

receiving metric data of a cloud system periodically, wherein the metric data comprises a plurality of fields;

transforming the metric data of each type into a byte array using mapping tables, wherein the byte array is an encoded format of the metric data, where each field of the metric data is encoded as a field ID and a field type ID that are short integer variables;

merging and storing the byte arrays of multiple metric data into a binary file, wherein the binary file comprises multiple blocks with each block comprising multiple byte arrays;

generating indexes for common fields of different metric data in the binary file;

receiving a retrieval request requesting metric records including a common field of a particular value;

determining storage locations of one or more metric records satisfying the retrieval request using the index of the common field, the index of a common field being included in i) an offset table comprising a position offset of each matching metric record in the binary file, and ii) a key table indicating a number of matching metric records for each particular value and a stating location of the number of metric records in the offset table; and obtaining the one or more metric records satisfying the retrieval request from the binary file using the corresponding storage locations.

2. The method of claim 1, further comprising:

redefining each field included in the metric data in the mapping tables.

3. The method of claim 2, wherein redefining each field comprises:

mapping a field name of the field into a field ID in a first mapping table; and mapping a data type of the field into a field type ID in a second mapping table.

4. The method of claim 3, wherein the field ID is a short integer variable representing the field name, and the field type ID is a second short integer variable representing the data type of the field.

5. The method of claim 1, wherein the byte arrays in the binary file are ordered by corresponding time stamps.

6. The method of claim 1, wherein the index of a common field indicates a storage location of a metric record included in the binary file that matches the particular value of the common field.

7. A non-transitory computer-readable storage medium coupled to one or more processors and having instructions stored thereon which, when executed by the one or more processors, cause the one or more processors to perform operations for metric data management, the operations comprising:

receiving metric data of a cloud system periodically, wherein the metric data comprises a plurality of fields;

transforming the metric data of each type into a byte array using mapping tables, wherein the byte array is an encoded format of the metric data, where each field of the metric data is encoded as a field ID and a field type ID that are short integer variables;

merging and storing the byte arrays of multiple metric data into a binary file, wherein the binary file comprises multiple blocks with each block comprising multiple byte arrays;

generating indexes for common fields of different metric data in the binary file;

receiving a retrieval request requesting metric records including a common field of a particular value;

determining storage locations of one or more metric records satisfying the retrieval request using the index of the common field, the index of a common field being included in i) an offset table comprising a position offset of each matching metric record in the binary file, and ii) a key table indicating a number of matching metric records for each particular value and a stating location of the number of metric records in the offset table; and obtaining the one or more metric records satisfying the retrieval request from the binary file using the corresponding storage locations.

8. The non-transitory computer-readable storage medium of claim 7, wherein the operations further comprise:

redefining each field included in the metric data in the mapping tables.

9. The non-transitory computer-readable storage medium of claim 8, wherein redefining each field comprises:

mapping a field name of the field into a field ID in a first mapping table; and mapping a data type of the field into a field type ID in a second mapping table.

10. The non-transitory computer-readable storage medium of claim 9, wherein the field ID is a short integer variable representing the field name, and the field type ID is a second short integer variable representing the data type of the field.

11. The non-transitory computer-readable storage medium of claim 7, wherein the byte arrays in the binary file are ordered by corresponding time stamps.

12. The non-transitory computer-readable storage medium of claim 7, wherein the index of a common field indicates a storage location of a metric record included in the binary file that matches the particular value of the common field.

13. A system, comprising:

a computing device; and a computer-readable storage device coupled to the computing device and having instructions stored thereon which, when executed by the computing device, cause the computing device to perform operations for metric data management, the operations comprising:

receiving metric data of a cloud system periodically, wherein the metric data comprises a plurality of fields;

transforming the metric data of each type into a byte array using mapping tables, wherein the byte array is an encoded format of the metric data, where each field of the metric data is encoded as a field ID and a field type ID that are short integer variables;

merging and storing the byte arrays of multiple metric data into a binary file, wherein the binary file comprises multiple blocks with each block comprising multiple byte arrays;

generating indexes for common fields of different metric data in the binary file;

receiving a retrieval request requesting metric records including a common field of a particular value;

determining storage locations of one or more metric records satisfying the retrieval request using the index of the common field, the index of a common field being included in i) an offset table comprising a position offset of each matching metric record in the binary file, and ii) a key table indicating a number of matching metric records for each particular value and a stating location of the number of metric records in the offset table; and obtaining the one or more metric records satisfying the retrieval request from the binary file using the corresponding storage locations.

14. The system of claim 13, wherein the operations further comprise:

redefining each field included in the metric data in the mapping tables.

15. The system of claim 14, wherein redefining each field comprises:
   mapping a field name of the field into a field ID in a first mapping table; and
   mapping a data type of the field into a field type ID in a second mapping table.

16. The system of claim 15, wherein the field ID is a short integer variable representing the field name, and the field type ID is a second short integer variable representing the data type of the field.

17. The system of claim 13, wherein the byte arrays in the binary file are ordered by corresponding time stamps.

* * * * *